United States Patent
Ciarlini et al.

(10) Patent No.: US 10,360,215 B1
(45) Date of Patent: Jul. 23, 2019

(54) METHODS AND APPARATUS FOR PARALLEL EVALUATION OF PATTERN QUERIES OVER LARGE N-DIMENSIONAL DATASETS TO IDENTIFY FEATURES OF INTEREST

(71) Applicant: EMC Corporation, Hopkinton, MA (US)

(72) Inventors: Angelo E. M. Ciarlini, Rio de Janeiro (BR); Fabio A. M. Porto, Rio de Janeiro (BR); Amir H. K. Moghadam, Rio de Janeiro (BR); Jonas F. Bias, Rio de Janeiro (BR); Paulo de Figueiredo Pires, Rio de Janeiro (BR); Fabio A. Perosi, Rio de Janeiro (BR); Alex L. Bordignon, Rio de Janeiro (BR); Bruno Carlos da Cunha Costa, Rio de Janeiro (BR); Wagner dos Santos Vieira, Rio de Janeiro (BR)

(73) Assignee: EMC Corporation, Hopkinton, MA (US)

( * ) Notice: Subject to any disclaimer, the term of this patent is extended or adjusted under 35 U.S.C. 154(b) by 849 days.

(21) Appl. No.: 14/672,516

(22) Filed: Mar. 30, 2015

(51) Int. Cl.
*G06F 16/00* (2019.01)
*G06F 16/2455* (2019.01)
*G06F 16/22* (2019.01)

(52) U.S. Cl.
CPC ...... *G06F 16/2455* (2019.01); *G06F 16/2264* (2019.01)

(58) Field of Classification Search
None
See application file for complete search history.

(56) References Cited

U.S. PATENT DOCUMENTS 5,940,825 A * 8/1999 Castelli .................. G01V 1/288
7,464,088 B1 * 12/2008 Chiang ............. G06F 17/30985
(Continued)

OTHER PUBLICATIONS

Stehle, "Pattern Matching Via Sequence Alignment: Analysing Spatio-Temporal Distances", http://www.geocomputation.org/2013/papers/84.pdf, all pages, 2013. (Year: 2013).*
(Continued)

*Primary Examiner* — Son T Hoang
(74) *Attorney, Agent, or Firm* — Ryan, Mason & Lewis, LLP

(57) ABSTRACT

Pattern queries are evaluated in parallel over large N-dimensional datasets to identify features of interest. Similarity-based pattern matching tasks are executed over N-dimensional input datasets comprised of numeric values by providing data representations for the N-dimensional input datasets, a pattern query and one or more candidate solutions for the pattern query, such that the pattern query specifies a pattern of an N-dimensional body that is compared to at least one candidate solution corresponding to an N-dimensional body extracted from the N-dimensional input datasets; defining a distance metric that compares the N-dimensional body formed by the candidate solution extracted from the N-dimensional input datasets and the N-dimensional body formed by the pattern query, taking into account one or more of the following criteria: differences between mapped values, differences in scale and differences in shape; and executing, in parallel, a plurality of independent instances of at least one algebraic operator to generate and score the candidate solutions based on the distance metric. The exemplary algebraic operators comprise a Trace Match operator, a Ranking operator, a Candidate Solution operator, and a Query Clustering operator.

26 Claims, 10 Drawing Sheets

(56) References Cited

U.S. PATENT DOCUMENTS

| | | | | |
|---|---|---|---|---|
| 2009/0313016 | A1* | 12/2009 | Cevik | G10L 15/22 704/241 |
| 2011/0246483 | A1* | 10/2011 | Darr | G06Q 10/10 707/748 |
| 2014/0297621 | A1* | 10/2014 | Hu | G06F 17/30424 707/722 |
| 2014/0309938 | A1* | 10/2014 | Bardainne | G01V 1/003 702/14 |
| 2015/0088791 | A1* | 3/2015 | Lin | G06N 99/005 706/12 |
| 2015/0338538 | A1* | 11/2015 | Liu | G01V 1/282 702/17 |
| 2016/0179883 | A1* | 6/2016 | Chen | G06F 17/30292 707/714 |

OTHER PUBLICATIONS

Berndt et al., "Using Dynamic Time Warping to Find Patterns in Time Series", AAA1 Technical Report WS-94-03. Workshop on Knowledge Discovery in Databases, pp. 359-370 (1994).

Belongie et al., "Matching with Shape Contexts", Department of Electrical Engineering and Computer Sciences, IEEE (2000).

Dave Hale, "Dynamic Warping of Seismic Images", Center for Wave Phenomena, pp. 723-244, Colorado School of Mines, Golden, CO.

Pishculin et al., "Image Warping for Face Recognition: From Local Optimality Towards Global Optimization", Pattern Recognition 45, pp. 3131-3140 (2012).

Paul De Groot, "Global Seismic Interpretation Techniques are Coming of Age", 23rd International Geophysical Conference and Exhibition, Melbourne, Australia (2013).

Van Hoek, et al., "Geometric Attributes for Seismic Stratigraphic Interpretation", The Leading Edge, pp. 1056-1065 (2010).

Hoyes et al., "A Review of Global Interpretation Methods for Automated 3D Horizon Picking", The Leading Edge, pp. 936-943 (2011).

Anil K. Jain, "Data Clustering: 50 Years Beyond K-Means", International Conference on Pattern Recognition, Tampa, FL (2008).

* cited by examiner

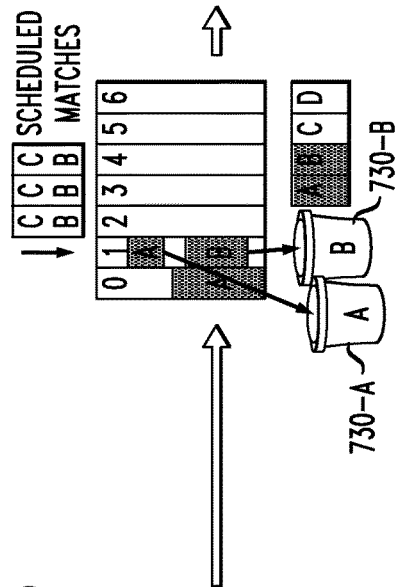
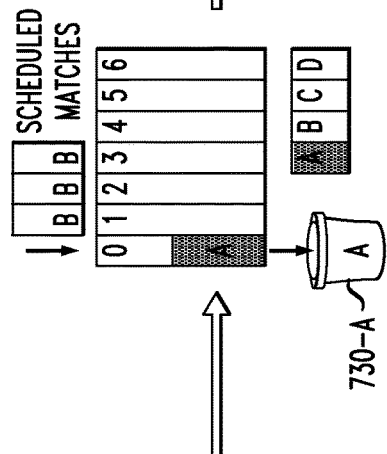
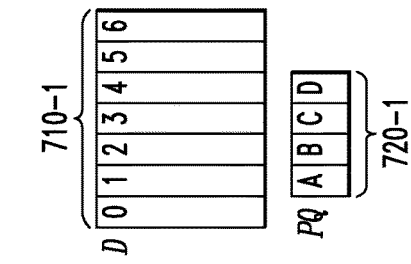
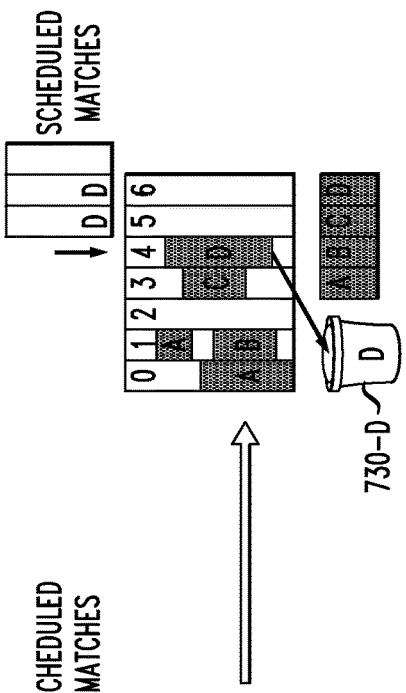
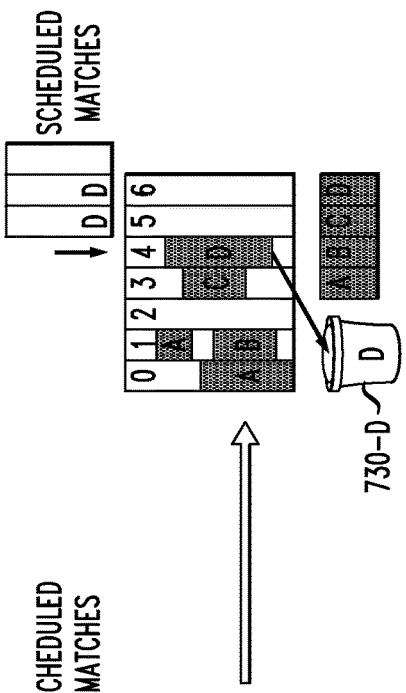
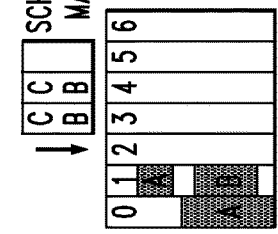

TraceMatchIlluminate Function

1  Input: $PQ$, $D$, threshold, $\varepsilon$
2  $M \leftarrow \{\}$
3  Call InitializeIllumination // traces of $D$ are illuminated just for $1^{st}$ trace of $PQ$
4  For each $tr$ in $D$ do
5    For each $qtr$ in $PQ$ do
6      If (Illuminated($tr.id$, $qtr.id$))
7        Call EvaluateMatchIlluminate($tr$,$qtr$,threshold,$\varepsilon$) returning matches
8        $M(qtr.id) \leftarrow M(qtr.id) \cup$ matches
9      End If
10   End For
11   Call AdvanceIllumination
12 End For
13 return $M$

EvaluateMatchIlluminate Auxiliary Function

1  Input: trace $tr$ from $D$, trace fragment $qtr$ from $PQ$, threshold, $\varepsilon$
2  call dtw($qtr$, $tr$, threshold) returning matches
3  If matches $\neq \{\}$
4    Illuminate($tr.id+1$, $tr.id+\varepsilon$, $qtr.id+1$)
5  End If
6  return matches

| CandidateSolution function |
|---|
| 1  Input: $M, B, \theta$ |
| 2  $S \leftarrow M_1$ // initialize the result set with the content of the first bucket |
| 3  For i = 2 to k do // where $k$ is the total amount of buckets |
| 4    Call $FilterRelatedConstraints(B, \theta, i)$ returning $ActiveConstraints$ |
| 5    $S \leftarrow S \bowtie_{ActiveConstraints} M_i$ |
| 6  End For |
| 7  return $S$ |

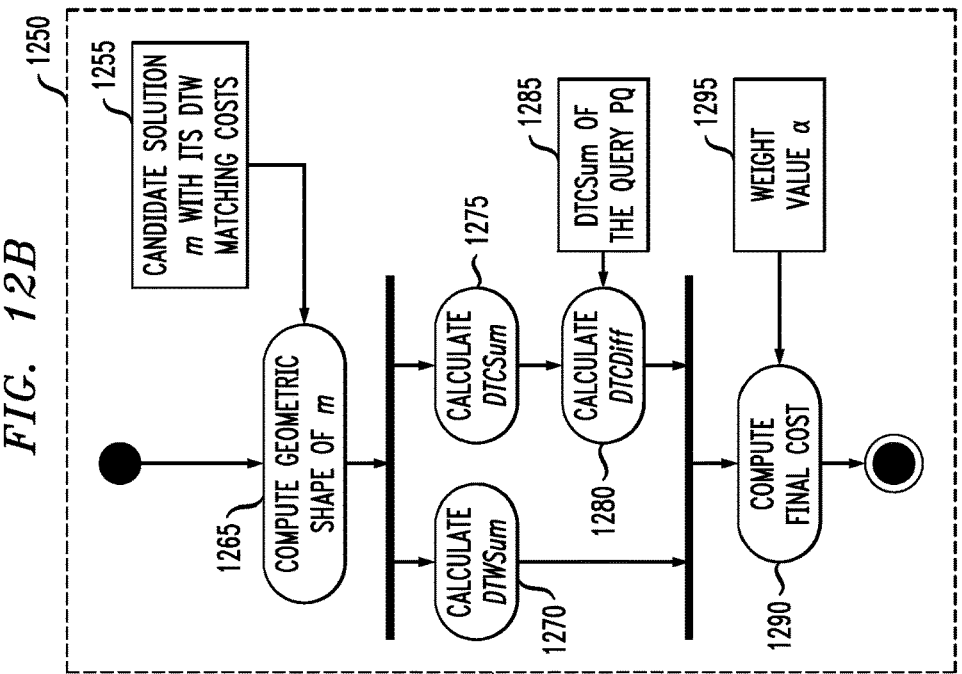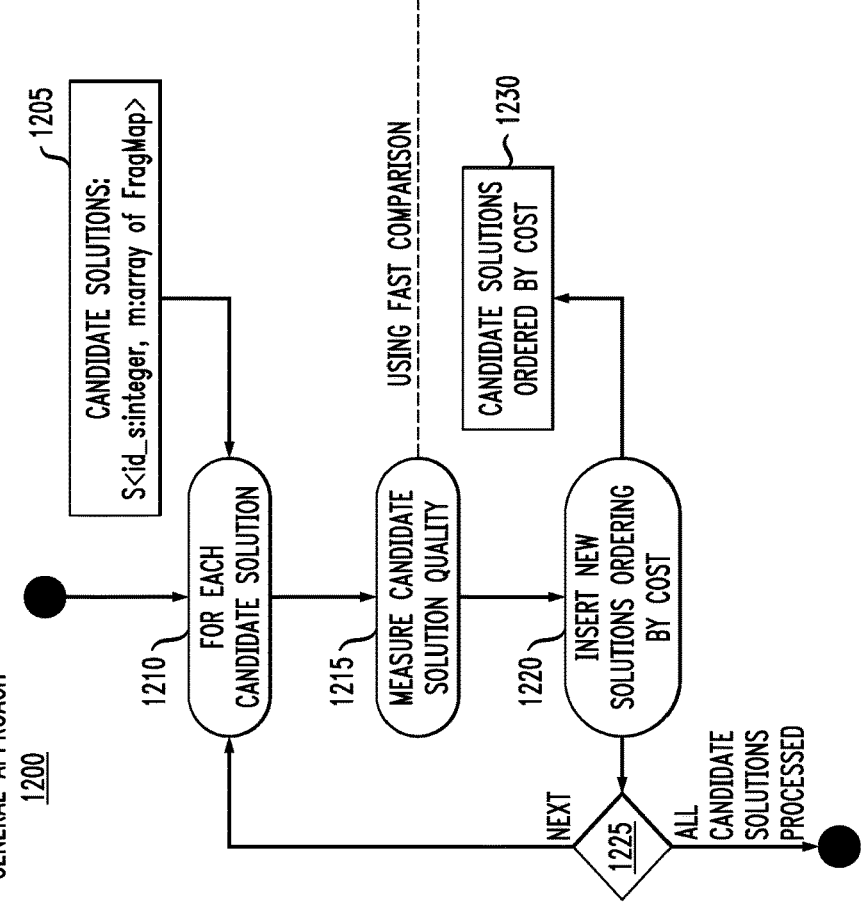

METHODS AND APPARATUS FOR PARALLEL EVALUATION OF PATTERN QUERIES OVER LARGE N-DIMENSIONAL DATASETS TO IDENTIFY FEATURES OF INTEREST

FIELD

The field relates generally to the identification of features of interest in a large N-dimensional dimensional dataset.

BACKGROUND

Seismic interpretation is a process that aims to investigate the earth subsurface in order to collect relevant information for analysis and to identify hydrocarbon reservoirs in seismic datasets. Seismic interpretation is a time consuming process that is executed by highly skilled interpreters that must deal with the intrinsic uncertainty of the problem. The earth subsurface consists of material layers with distinct mineral densities and porosity characteristics. The interfaces between material layers are called horizons, which are the basic structure for seismic interpretation. Horizons can be analyzed to indicate the existence of faults, stratigraphic structures or structural styles. The identification of such seismic features is an important step in the interpretation of geological and geophysical characteristics of a region underlying subsurface. The task, however, is daunting, due to the nature of seismic data. Seismic datasets are examples of N-dimensional structures with values assigned to each position in the N-dimensional space. The identification of features can occur either in two dimensional datasets, three dimensional datasets or even four dimensional datasets (three spatial coordinates plus time). The automatic search for patterns in these large data structures is a challenge due to the combinatorial nature of the search since, in principle, patterns can be positioned at any point of these large structures (that can have billions of points) and rotations might need to be taken into account. Examples of similar challenges can also be found in other scientific domains such as Astronomy and Biology.

A need exists for methods and apparatus that allow data interpreters to automatically search for features of interest in large N-dimensional datasets, such as a dataset comprised of seismic traces. In the case of seismic data, for example, the features can correspond to the presence of hydrocarbon indicators or other geological features that are important for seismic interpreters. The rapid reconnaissance of points of interest can reduce the uncertainty and speed up the process.

SUMMARY

Illustrative embodiments of the present invention provide methods and apparatus for parallel evaluation of pattern queries over large N-dimensional datasets to identify features of interest. In one exemplary embodiment, similarity-based pattern matching tasks are executed over one or more N-dimensional input datasets comprised of numeric values by providing data representations for the one or more N-dimensional input datasets, a pattern query and one or more candidate solutions for the pattern query, such that the pattern query specifies a pattern of an N-dimensional body that is compared to at least one of the candidate solutions corresponding to an N-dimensional body extracted from the one or more N-dimensional input datasets; defining a distance metric that compares the N-dimensional body formed by the at least one candidate solution extracted from the one or more N-dimensional input datasets and the N-dimensional body formed by the pattern query, taking into account one or more of the following criteria: differences between mapped values, differences in scale and differences in shape; and executing, in parallel, a plurality of independent instances of at least one algebraic operator to generate and score one or more of the candidate solutions based on the distance metric.

According to one aspect of the invention, the algebraic operator comprises a Trace Match operator that identifies trace fragments in the one or more N-dimensional input datasets that are similar to one or more of trace fragments of the pattern query. According to another aspect of the invention, the algebraic operator comprises a Candidate Solution operator that combines one or more trace fragments and evaluates a plurality of constraints to decide whether a given candidate solution is valid. According to a further aspect of the invention, the algebraic operator comprises a Ranking operator that ranks the one or more candidate solutions based on the distance metric calculated by a cost function. According to an additional aspect of the invention, one or more trace fragments of the pattern query using a Query Clustering operator such that the pattern query is reduced to a smaller set of representative trace fragments.

Another aspect of the invention dynamically selects one of a plurality of implementations of the at least one algebraic operator based on one or more of characteristics of the pattern query, information about the one or more N-dimensional input datasets and available computing resources.

Advantageously, illustrative embodiments of the invention provide improved techniques for identifying features of interest in one or more large N-dimensional datasets. These and other features and advantages of the present invention will become more readily apparent from the accompanying drawings and the following detailed description.

BRIEF DESCRIPTION OF THE DRAWINGS

FIG. 7A-7F, collectively illustrate an exemplary execution of a Trace Match with illumination function (FIG. 8), as the traces of the dataset D are processed one after another;

FIG. 8 illustrates exemplary pseudo code for an exemplary implementation of the Trace MatchIlluminate function;

FIG. 9 illustrates exemplary pseudo code for a general implementation of an EvaluateMatchIlluminate function related to the pseudo code of FIG. 8;

FIG. 11 illustrates exemplary pseudo code for an implementation of the Candidate Solution operator of FIG. 1;

FIG. 12A is a flow chart illustrating an exemplary implementation of the ranking operator of FIG. 1 and FIG. 12B illustrates an exemplary implementation of a related quality measure process that measures the quality of a candidate solution using an exemplary fast comparison approach;

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide an architecture and an algebra for the parallel evaluation of pattern queries over large N-dimensional datasets, such as a dataset comprised of seismic traces, to identify features of interest within the dataset. A pattern query expresses a model for a feature of interest using a set of traces that corresponds to an N-dimensional body. Similarity-based comparison methods are employed to identify and rank candidate features matching the query. The exemplary process is highly parallelizable and can be deployed on parallel execution environments, such as Massively Parallel Processing (MPP) databases, Hadoop clusters or another distributed system extended to run sequence matching algorithms.

One aspect of the invention employs a formalized concept of pattern queries and uses an algebra to combine operators in order to efficiently answer the queries. In one exemplary embodiment, the disclosed algebra identifies and ranks candidate seismic features matching a given seismic pattern query.

Patterns to be identified can vary in scale and shape and can correspond to rotations around the vertical axis. Thus, another aspect of the invention identifies matching candidates in different spatial scales with respect to the pattern query. Yet another aspect of the invention addresses candidate matches exhibiting different shapes with respect to the pattern query.

In order to address the combinatorial problem, one or more embodiments of the invention employ an architecture designed for parallel execution of pattern queries over seismic data and an implementation based on massive parallelism.

Pattern detection is a common issue in data processing, not only in similarity search queries. Thus, aspects of the invention can be employed for purposes other than the exemplary seismic interpretation purpose, as would be apparent to a person of ordinary skill in the art. The components of the exemplary disclosed architecture support an algebra that is an extension of the relational algebra with a number of additional exemplary types of operators. These exemplary operators can be reused and combined in other domains, such as data compression processing and specific seismic processing algorithms other than pattern recognition. In addition, new operators can be added to the algebra to support new features, as would be apparent to a person of ordinary skill in the art.

Figure 1:
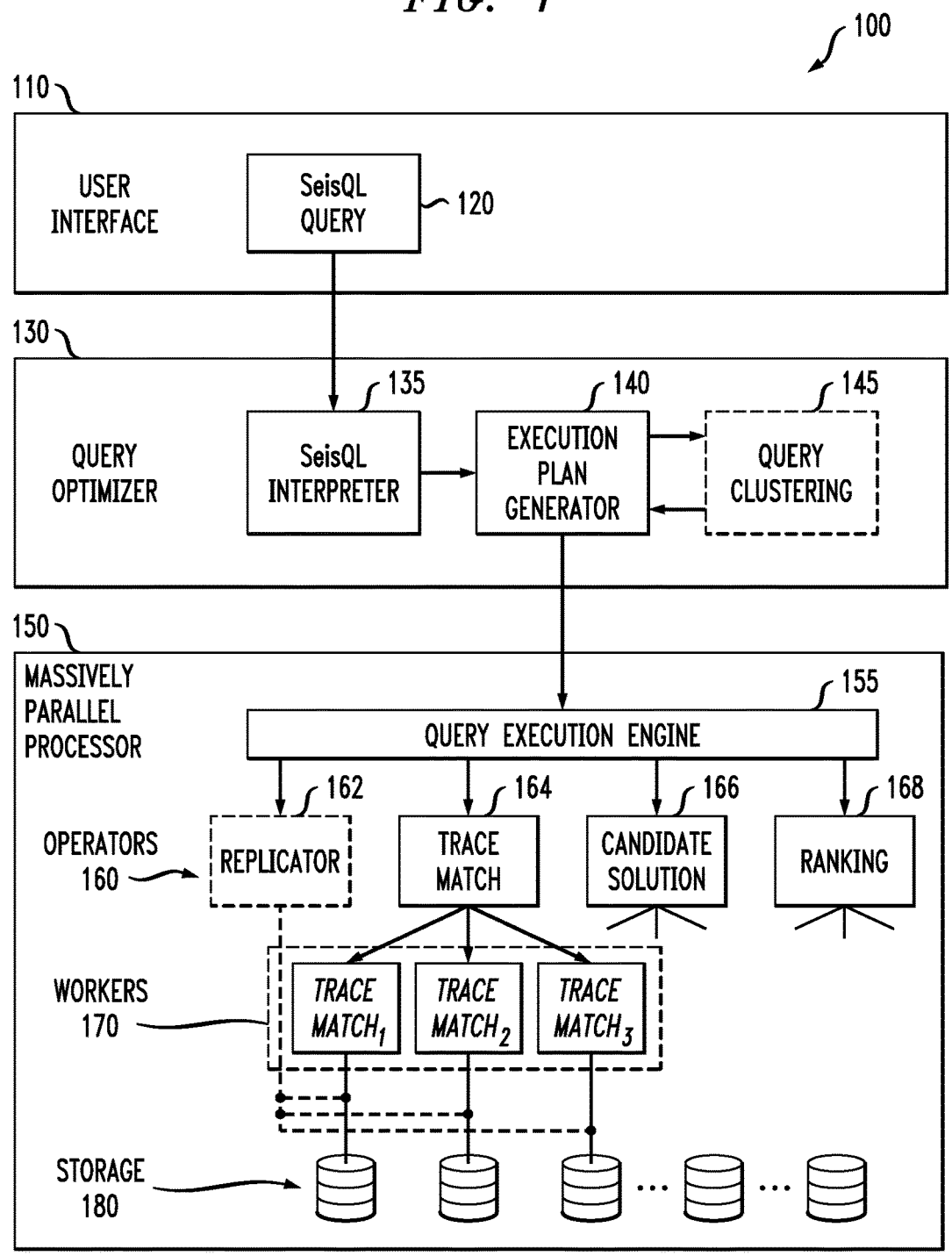
FIG. 1 illustrates an exemplary architecture for parallel evaluation of pattern queries over an exemplary seismic dataset in accordance with aspects of the invention.

FIG. 1 illustrates an exemplary architecture 100 for parallel evaluation of pattern queries over an exemplary seismic dataset in accordance with aspects of the invention. An exemplary seismic dataset is discussed further below in conjunction with FIG. 2. As shown in FIG. 1, a user can employ a user interface 110 to define a seismic pattern query 120 by means of a query language, referred to as a SeisQL (seismic query language). SeisQL is a declarative language specifically tailored to express queries over seismic data (e.g., traces) using high-level semantics. Nevertheless, as used herein, SeisQL is a representation of the pattern query PQ, which is composed of a set of trace fragments, as described in the section below entitled "Definition of Seismic Pattern Queries."

A query optimizer 130 comprises a SeisQL Interpreter 135 that analyzes syntactically and semantically the pattern query 120 and passes the pattern query 120 to an execution plan generator 140 that optionally employs a Query Clustering operator 145, as discussed further below in conjunction with FIG. 4, to simplify the query.

The execution plan generator 140 combines instances of the types of seismic operators described in the section entitled "Seismic Algebra Operators" and relational operators to build a query execution plan, discussed further below in conjunction with FIG. 13. According to another aspect of the invention, one of a plurality of available implementations of at least one algebraic operator is dynamically selected during the optimization process, based on, for example, characteristics of the pattern query, information about the dataset and/or available computing resources. At least one goal of the query optimizer 130 is to improve the parallelism by making sure that computation can occur as much as possible in a shared-nothing fashion. In this way, the use of an optional replicator operator 162, as discussed further below in conjunction with FIG. 10, with the right parameters is an important part of this process.

The plan generated by the execution plan generator 140 and the simplified pattern query 120 are then passed to a query execution engine 155 in the massively parallel processor (MPP) 150. The query execution engine 155 activates operators 160 according to the plan in various nodes of a storage system 180. The exemplary operators 160 are discussed in the following section.

A plurality of instances of at least one algebraic operator 160 are executed as workers 170 in parallel to generate a candidate solution comprising traces in the dataset that are similar to the patterns of interest in the pattern query 120.

Query Execution Over N-Dimensional Data Using Algebraic Operators

As noted above, a pattern query 120 corresponds to a set of seismic trace fragments, which define a feature one would like to find within a seismic dataset. Such feature corresponds to an N-dimensional body with numerical values assigned to each of its points. The processing of a pattern query is guided by a query execution plan (FIG. 13), which is composed of the following types of seismic algebraic operators 160: Query Clustering operator type 145, Trace Match operator type 164, Candidate Solution operator type 166, Ranking operator type 168 and Replicator operator type 162. Each type of operator 160 can have multiple operators that implement specific algorithms.

The Query Clustering operator type 145 is optional and aims at clustering similar trace fragments in the query in order to reduce its complexity, taking advantage of the fact that neighboring traces tend to be similar. The Query Clustering operator type 145 is then designed to transform the original query into a smaller version with less, but representative, trace fragments. One exemplary implementation of the Query Clustering operator type 145 is discussed further below in conjunction with FIG. 4.

The Trace Match operator type 164 implements matching algorithms between trace fragments of the query and traces from the seismic dataset. For each trace fragment of the query and each trace of the dataset, the Trace Match operator type 164 selects similar fragments of the dataset trace and calculates a similarity matching cost. As a result of the application of the Trace Match operator 164 between a query and the dataset, all matches between the fragments of the query and promising fragments of the dataset are computed and scored. Two exemplary implementations of the Trace Match operator type 164 are discussed further below in conjunction with FIGS. 5-9. In at least one implementation, the Trace Match operator 164 is naturally embarrassingly parallel. As used herein the phrase "embarrassingly parallel" means that little or no effort is required to separate the problem into a number of parallel, independent, tasks.

Figure 3:
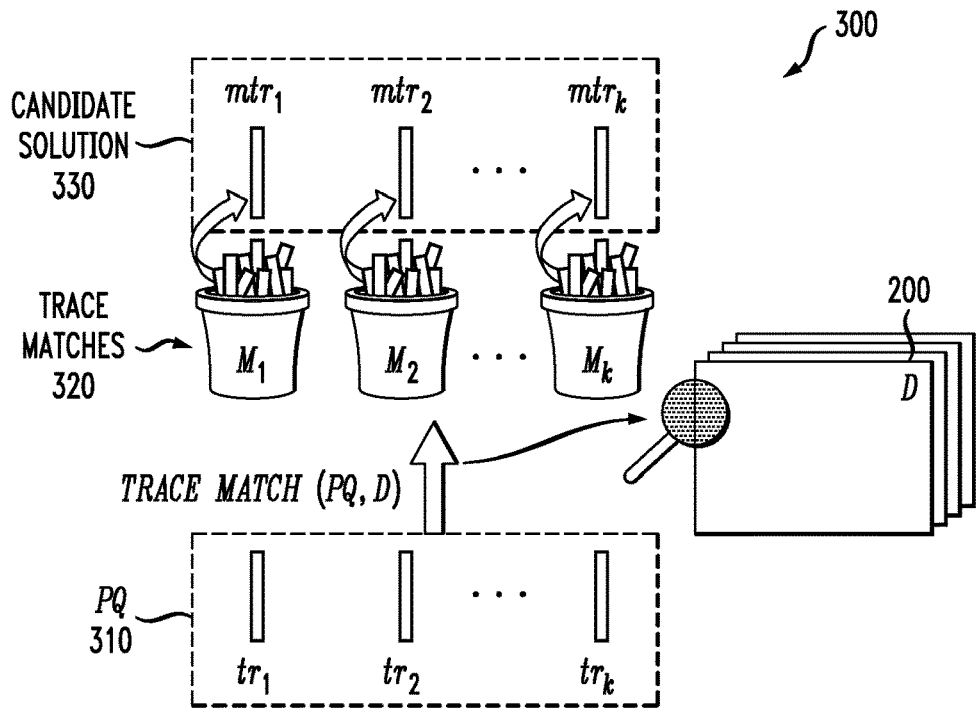
FIG. 3 illustrates an exemplary implementation of a candidate solution generation process.

The Candidate Solution operator type 166 combines promising trace fragments of the dataset that could compose a possible solution for the query. The composition of a solution takes into account the constraints imposed by the query, in particular, the spatial positioning of the fragments and possible simplifications that might have been imposed by using a Query Clustering operator. In at least one exemplary implementation, a Candidate Solution operator 166, discussed further below in conjunction with FIGS. 3 and 11, is not embarrassingly parallel. However, if the generated plan considers data replication, using the replicator operator 162, the execution of the Candidate Solution operator 166 occurs with minimal data movement between nodes.

For each possible solution, a Ranking operator type 168 sorts the candidate solutions (330, as discussed further below in conjunction with FIG. 3) based on a similarity distance metric calculated by a cost function. Three exemplary implementations of the Ranking operator type 168 are discussed further below in conjunction with FIGS. 12A and 12B. In at least one exemplary implementation, the first step of the Ranking operator 168 that evaluates the scores of the candidate solutions 330 (FIG. 3) is also embarrassingly parallel. In one exemplary implementation, the second and final step of the Ranking operator 168 essentially merges the results in order to obtain a single sorted ranking.

The Replicator operator type 162 is designed for data replication. Depending on the set of operators used in a query, the query optimizer 130 may decide to interpose them with Replicator operator types 162 in order to optimize the query execution plan (FIG. 13). Since the queries are processed in parallel, the Replicator operator 162 aims at increasing the degree of parallelism of the query. One exemplary implementation of the Replicator operator type 162 is discussed further below in conjunction with FIG. 10.

The current exemplary operators 160 make extensive use of the Dynamic Time Warping (DTW) algorithm. See, for example, Donald J. Berndt and James Clifford, "Using Dynamic Time Warping to Find Patterns in Time Series," Proc. AAAI Workshop on Knowledge Discovery in Databases, 359-70 (1994), incorporated by reference herein. DTW is a technique for comparing two waveform representations despite a wide variation in scale and timing. DTW has been applied with success in various areas where sequences show scale and timing variations. Notable examples include its application to speech recognition, dealing with differences in speech rate between matching targets, as well as in DNA sequence alignment, dealing with amino-acid insertions and deletions in comparing sequences. In the context of pattern queries processing over N-dimensional data, DTW is applied as a matching algorithm between two traces and is provided, in one or more embodiments of this invention, as a concrete implementation for the Trace Match algebraic operator type 164. Additionally, each matching of sequences using DTW produces a matching cost, i.e., a similarity distance metric between trace fragments, which is usually considered by the Ranking operators as part of the ranking cost, i.e. the overall distance metric between the pattern query and a candidate solution. In addition, the overall distance metric also considers the relative position of the traces in the matched area.

The exemplary approach follows a query processing architecture. As noted above, a pattern query corresponds to a set of seismic trace fragments, which define an N-dimensional body corresponding to a feature one would like to find within a seismic dataset. A feature can be horizons, seismic stratigraphic structures (onlaps, downlaps, toplaps) or structural styles. The execution of the query identifies regions in the dataset the traces of which form a feature similar to that of the pattern query. The similarity between two sets of traces (i.e. pattern query and seismic dataset traces) is evaluated by mapping samples in one set to those in the other set. This process takes into account variations in scale between the features as well as the effect of "stretching" or "shrinking" applied on them. As a result, features presenting variations in the spatial distribution among their traces may still match with a feature represented by a given pattern query. The matching quality will be sensitive to those variations associating a corresponding matching cost, and enabling the ranking of different matched candidate features.

The exemplary MPP Architecture shown in FIG. 1 comprises a set of software artifacts specifically tailored to answer user queries formulated as seismic pattern queries PQs over a large set of seismic data in the dataset D. Moreover, since the architecture 100 follows a generic database architecture, its artifacts can be easily plugged into existing MPP databases or MapReduce engines.

Seismic interpreters typically use specialized computer programs to analyze seismic data. These programs run on top of workstations with limited computing power. Alternatively, the disclosed approach can take advantage of large-scale computing. Data can be distributed over many resources. Consequently, the execution engine 155 takes advantage of parallelism to process the query. This scenario allows for efficient execution of complex pattern matching queries and data transformations on very large datasets.

Definition of Seismic Pattern Queries

An exemplary seismic pattern query problem finds a set of candidate solutions S from a 4-tuple <D,PQ,B,CF>, where D is an N-dimensional dataset of numeric values, PQ is a pattern query, B is a set of constraint functions and CF is a similarity cost function. Solutions in S are the regions of D that best match the pattern query PQ taking into account B and CF. The search can be extended in a straightforward way for matching a pattern query PQ against a group of datasets by individually executing queries for each dataset D.

Figure 2:
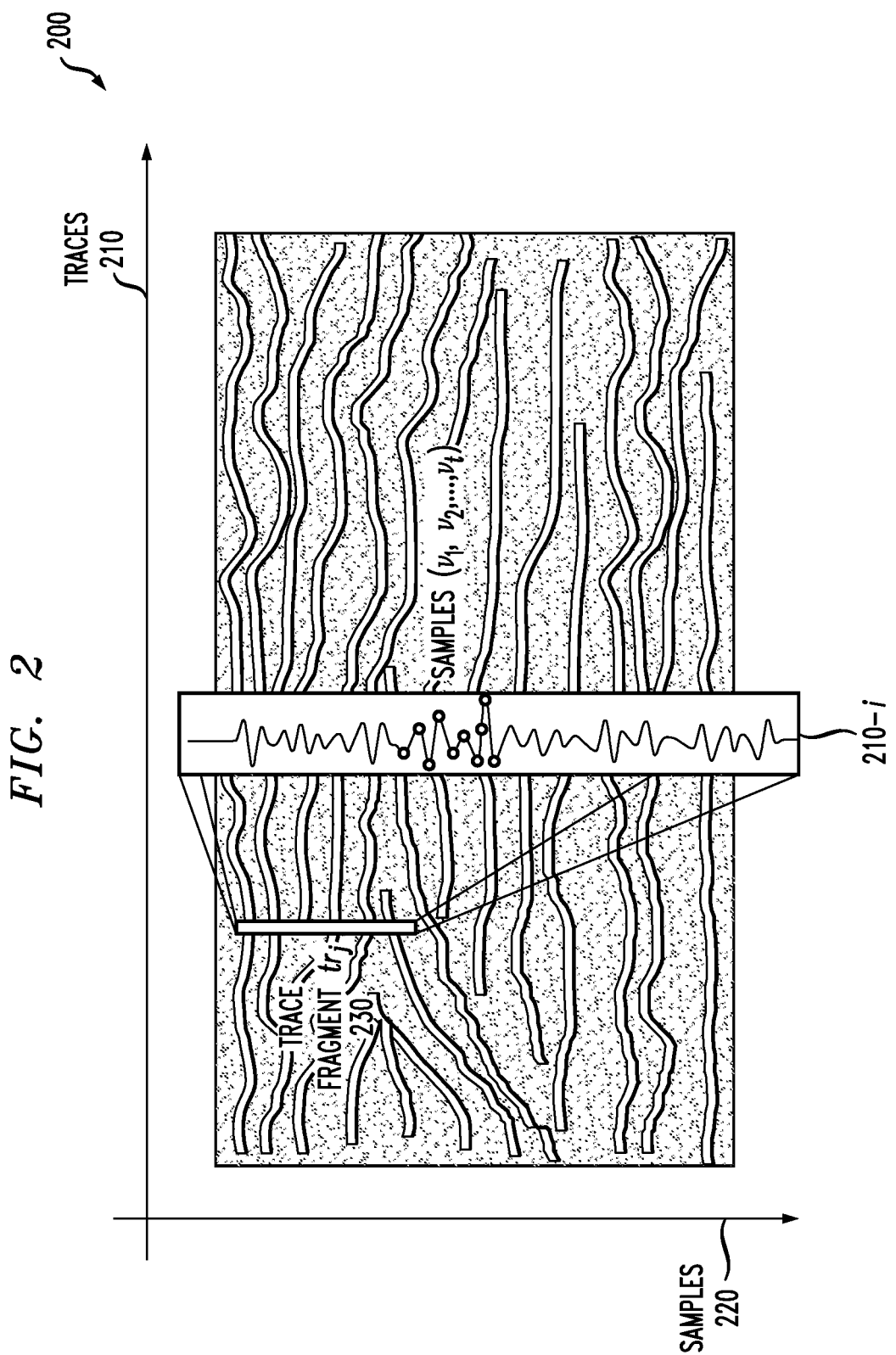
FIG. 2 illustrates an exemplary dataset, typically stored according to the SEG-Y standard developed by the Society of Exploration Geophysicists (SEG), that may be processed by the system of FIG. 1.

FIG. 2 illustrates an exemplary dataset 200 typically stored according to the SEG-Y standard developed by the Society of Exploration Geophysicists (SEG). The exemplary SEG-Y dataset 200 comprises a plurality p of traces 210, such as a given trace 210-$i$, and m samples 220 per trace. Thus, exemplary SEG-Y dataset 200 has a total of p×m samples. Each trace is comprised of: (a) a sequence of m numeric values (samples), and (b) an (N-1)-spatial position, with the $N^{th}$ coordinate of each value given by its position within the corresponding sequence. A seismic dataset 200 comprises many seismic traces 210. Each seismic trace 210 represents a sequence of floating-point sample values 220 containing the amplitude of the sound waves reflected by minerals beneath the surface. Each sample 220 of a seismic trace 210 corresponds to a specific depth or to a time delay according to the sampling rate. A seismic dataset 200 can be either pre-stack or post-stack data. Pre-stack data corresponds to the raw data, which needs to be processed in order to generate the post-stack data, which is the main source of information for seismic interpretation. Seismic interpretation is a crucial phase for the upstream oil and gas cycle because it tries to identify the potential regions where hydrocarbons can be found.

The exemplary methods are based on the execution of queries against post-stack seismic data so that specific patterns can be found and ranked. Although one or more exemplary embodiments process post-stack data, aspects of the invention can be employed to find patterns on pre-stack data, as would be apparent to a person of ordinary skill in the art, which could be useful to improve the efficiency in the seismic processing phase. In addition, aspects of the invention can be employed to find patterns on N-dimensional datasets of other domains as would also be apparent to a person of ordinary skill in the art A sample 220 is considered to be a minimal unit of data and a trace fragment 230 is a tuple tr=>id, x, y, offset, V>, where id is the identification of the fragment 230, x and y are the coordinates in the horizontal plane to which the seismic trace 210 corresponds, offset is the position in the original trace 210 where the fragment 230 starts and $V=[v_1, v_2, \ldots, v_n]$ is a vector of samples 220 from this point on. In the particular case where offset=0 and n=m, the trace fragment 230 is a complete trace in D. The traces in D have a spatial relationship among them, which is considered in the pattern query.

A seismic pattern query problem is considered herein as finding a set of candidate solutions S from a 4-tuple <D,PQ,B,CF>, where D is a seismic dataset, such as the exemplary dataset 200, PQ is a pattern query, B is a set of constraint functions and CF is a similarity cost function. Solutions in S are the regions of D that best match the pattern query PQ taking into account B and CF.

The seismic dataset D (200) contains p traces 210 and m samples 220 per trace 210. The seismic dataset D (200) is a representation of a general SEG-Y file, as shown in FIG. 2, where shades of black correspond to amplitude values (in the exemplary embodiment, blacker shades indicate a higher amplitude). In pre- or post-stack seismic data, the samples 220 of a trace 210 represent the amplitude of the reflected wave, which was reflected in specific points of the region of the seismic acquisition, captured by the hydrophones/geophones. High amplitudes usually indicate the interface between geological layers.

FIG. 3 illustrates an exemplary implementation of a candidate solution generation process 300. As shown in FIG. 3, a seismic pattern query PQ (310) is expressed as a set of trace fragments $PQ=\{tr_1, tr_2, \ldots, tr_k\}$, either extracted from a given dataset 200 or manually specified. Each trace fragment $tr_i \in PQ$ is composed of: (a) a sequence of numeric values (samples), (b) an (N-1)-spatial position and (c) an offset, which is added to the position of each value within the sequence to obtain the $N^{th}$ coordinate of said value. For each trace fragment $tr_i \in PQ$, a search is performed for similar traces in D. The similarity between two trace fragments can be measured by the distances between the waveforms described by the samples. For instance, the distance can be Euclidean, if the fragments have the same length, or calculated by DTW when the fragments can have different lengths (as discussed further below in the section entitled "Algebraic Operators for Queries over N-dimensional Data").

For a given $tr_i \in PQ$, the set of similar traces $mtr_j$ found in D can be represented by the matches 320, $M_i = \{(tr_i, \text{id}, mtr_1, d_1, p_1), (tr_i, \text{id}, mtr_2, d_2, p_2), \ldots, (tr_i, \text{id}, mtr_2, d_2, p_2)\}$ where each $d_j$ is the similarity measure between $tr_i$ and $mtr_j$ and each $p_j$ is a descriptor of the mapping. The trace matches in $M_i$ (320) can have many fragments coming from the same trace. The Trace Match operator is discussed further below in conjunction with FIG. 5.

After searching for similar traces for each one of the k trace fragments in PQ, the solution search space will be $M_1 \times M_2 \times \ldots \times M_k$. It means that, for each trace fragment in the query, there will be a set of similar trace fragments round in the dataset D. If one similar trace fragment is selected from each set $M_i$, a candidate solution 330 is obtained that is similar to the pattern query PQ, as shown in FIG. 3. A candidate solution 330 for the pattern query PQ is represented as a set of trace fragments that can be extracted from one input dataset. Each trace fragment corresponds to a subsequence of a trace from the original dataset with the offset corresponding to the position of the first value of the fragment in the trace.

Define $S = \{s_1, s_2, \ldots, s_m\}$ as a set of viable candidate solutions 330. Each $s_w \in S$ is a set with k trace fragments where for each $tr_i \in PQ$ there is an $mtr_j \in s_w$ such that $(tr_i, \text{id}, mtr_j, d_j, p_j) \in M_i$. Furthermore, for $tr_i, tr_j \in PQ$ and $mtr_i, mtr_j \in s_w$, respectively mapped to $tr_i$ and $tr_j$, there should be a transformation θ (a rotation around the vertical axis, a translation or a combination of both), referred to as θ-constraint, to be applied to $s_w$ such that:

$mtr'_i = θ(mtr_i)$ and $mtr'_j = θ(mtr_j)$;

If $tr_i.x < tr_j.x$ then $mtr'_i.x < mtr'_j.x$;

If $tr_i.y < tr_j.y$ then $mtr'_i.y < mtr'_j.y$.

In the case of a two-dimensional (2D) data instead of three-dimensional (3D) data, θ is restricted to be a translation. In one or more embodiments, these constraints are necessary to reinforce that the relative position of the fragments should be kept.

Consider $B = \{B_1, B_2, \ldots, B_v\}$ a set of Boolean constraint functions over the possible solutions, such that $B_i(s_w) = \text{true}$, $\forall s_w \in S$. For instance, these Boolean constraints might be related to the maximum allowed distance between trace fragments, in both horizontal and vertical directions. Another example is a constraint on the length of the trace fragments in the candidate solution 330 when compared with the fragments in the query, in order to avoid candidate solutions 330 that considerably differ in size from the query. Only the elements of $M_1 \times M_2 \times \ldots \times M_k$ that satisfy the constraints defined by B are selected to be part of S. Finally, CF is a cost function that maps the candidate solutions 330 into a distance metric (a score). The distance metric compares the N-dimensional body formed by a candidate solution 330 and the N-dimension body formed by the pattern query PQ, taking into account the alignment of trace fragments, differences in scale and differences in shape.

Thus, considering the pattern query problem identified by <D,PQ,B,CF>, one or more aspects of the invention are concerned about finding a strategy to efficiently compute S over D, given a pattern query PQ, under the constraints defined by B, and producing a ranking of solutions in S the values of which are given by the application of a cost function CF to each candidate solution $s_w \in S$.

In order to take part in bids, oil and as players often have to rapidly recognize the potential of an area to be explored. In such a situation, it is important to try to find specific patterns in seismic datasets even before performing a detailed seismic interpretation. In addition, during seismic interpretation, the process tends to be time consuming due to the fact that it is highly dependent on the interpreter skills to manually or semi-automatically explore the data. The execution of seismic pattern queries, as described herein, identities regions in the seismic dataset that deserve further attention, considerably speeding up the reconnaissance of the potential of a seismic dataset and even the seismic interpretation process itself. By specifying a pattern query as a set of trace fragments, a set of restrictions and a cost function, interpreters can define a pattern of interest to be identified within the dataset.

Algebraic Operators for Queries Over N-Dimensional Data

At least one aspect of the invention is based on five exemplary types of algebraic operators 160 for identifying and ranking candidate features matching a given pattern query over large N-dimensional data. As noted above, additional types of operators as well as alternative implementations of the exemplary operators types can be incorporated into the algebra, as would be apparent to a person of ordinary skill in the art.

The exemplary disclosed algebra uses database semantics, specifying an instance of the relational algebra with new operators designed to manipulate N-dimensional data (for instance, seismic data). The traditional relational algebra operators, such as selections ($\sigma$), projections ($\pi$) and joins ($\bowtie$) are also part of the algebra.

The exemplary disclosed algebra is based on the extended relational model, where data types can be either primitive (integer, real, string) or complex. Complex data types can be records, tables (sets of records) or arrays. In addition, complex data types can have a name and can be nested. All data is modeled in relations, each one assigned to a specific table data type. The main data type of the exemplary disclosed algebra is the TraceFrag type, which is a record data type with the following schema:

<id:integer, x:integer, y:integer, offset: integer, V:array of real>

Exemplary columns id, x, y, offset and V are used to describe the trace fragments, as described above. The queries and the seismic datasets are considered as tables of the type TraceFrag. In the case of seismic datasets, as the tuples correspond to complete traces, the offset is always 0 and the length of the corresponding arrays is constant and equal to the number of samples per trace.

In the following sub-sections, the five exemplary types of operators are described and one or more exemplary implementations for each of them.

Query Clustering

The characteristics of N-dimensional data in which points have a spatial relationship between them reveal that neighboring traces are very similar to each other. Similarly, in a pattern query PQ with k traces, one expects to find groups of similar traces. In addition, the number of comparisons in the Trace Matching step 320 of the exemplary candidate solution generation process 300 has as an upper bound, namely, the number of fragments in the query multiplied by the number of traces in the dataset, which is a considerable amount of computation.

Considering the above points, an optional query pre-computation step aims to cluster similar traces in a pattern query providing a simplified query with fewer traces, which tends to substantially accelerate the Trace Matching 320, the Candidate Solution evaluation 300 and Ranking. On each cluster therein computed, a representative trace is chosen and kept in the clustered query.

Figure 4:
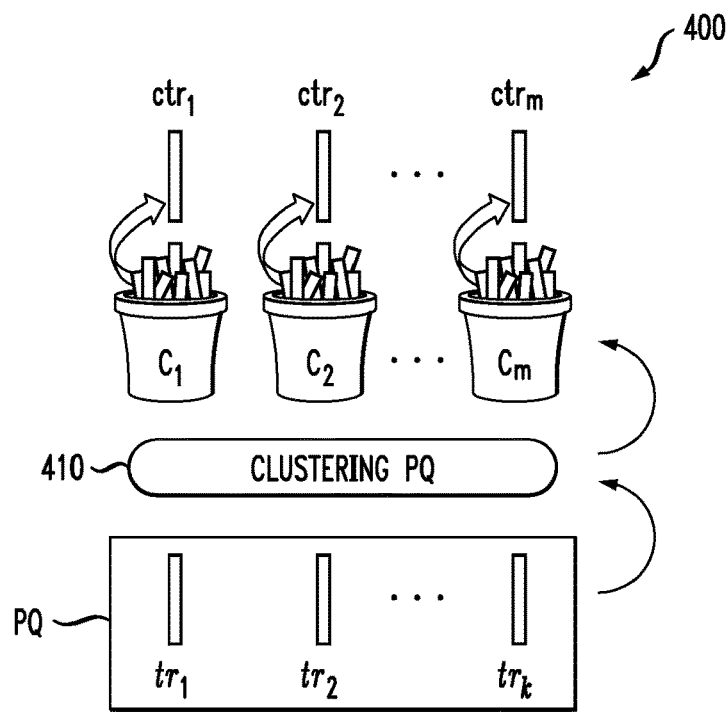
FIG. 4 illustrates an exemplary Query Clustering (PQ) process that pre-processes the proposed pattern query to create clusters.

FIG. 4 illustrates an exemplary Query Clustering (PQ) process 400 that pre-processes the proposed pattern query to create clusters. As shown in FIG. 4, the exemplary Query Clustering (PQ) operator type 145 pre-computes the pattern query PQ using a clustering algorithm 410 in order to find the most representative fragments in the pattern query PQ to reduce the processing time during the subsequent execution phases of the query. An exemplary implementation of Query pre-computation is a function $F_C$:

$$F_c(PQ) = \{ctr_1, ctr_2, \ldots, ctr_m\}$$

$$s.t.: m < k \text{ (the size of } PQ\text{)}$$

As shown in FIG. 4, the exemplary clustering algorithm 410 applies the function $F_c$ to the pattern query PQ and partitions its fragments into clusters $C_1, C_2, \ldots, C_m$. The function $F_c$ outputs a clustered pattern query PQ containing a set of trace fragments that represent each one of the m clusters. Thus, every fragment $tr_j$ in the pattern query PQ has representative $ctr_i$ in clustered pattern query PQ. In this way, the matching of traces can be restricted to a smaller set of trace fragments.

The exemplary Query Clustering (PQ) process 400 can be implemented by different clustering algorithms that are well-suited to time series such as K-Means Clustering, Hierarchical Clustering and Density Based Clustering. See, for example, Anil K. Jain, "Data clustering: 50 Years Beyond K-Means," Pattern Recognition Letters, Vol. 31, 651-66 (2010), incorporated by reference herein. All of the exemplary clustering algorithms are based on the evaluation of the similarity distance between the elements to be clustered.

At least one exemplary embodiment of the invention must consider the use of DTW to compute the similarity distance between trace fragments from the query. In addition, at least one exemplary embodiment of the invention must also consider not only the similarity between the traces but also the Euclidean distance between the coordinates (x, y) of the traces. The importance of taking into account the Euclidean distance between the coordinates is due to the fact that it should cluster only traces that are in the same region to keep the coherence of the query. As the size of the query is often small, the complexity of the clustering algorithms is not a key issue. In addition, to determine the choice of the representative fragment for every cluster $ctr_i$, different methods can be considered like choosing the first, the last, the longest or the shortest fragment in the cluster. Alternatively, the fragment in the cluster with the smallest average DTW distance to the other members of the cluster might also be a good choice. In our current implementation of the Query Clustering operator type, we are using Hierarchical Clustering since it doesn't need the prior definition of number of clusters and we choose the first sub-trace in every cluster as the representative of that cluster.

Trace Match Operator

Figure 5:
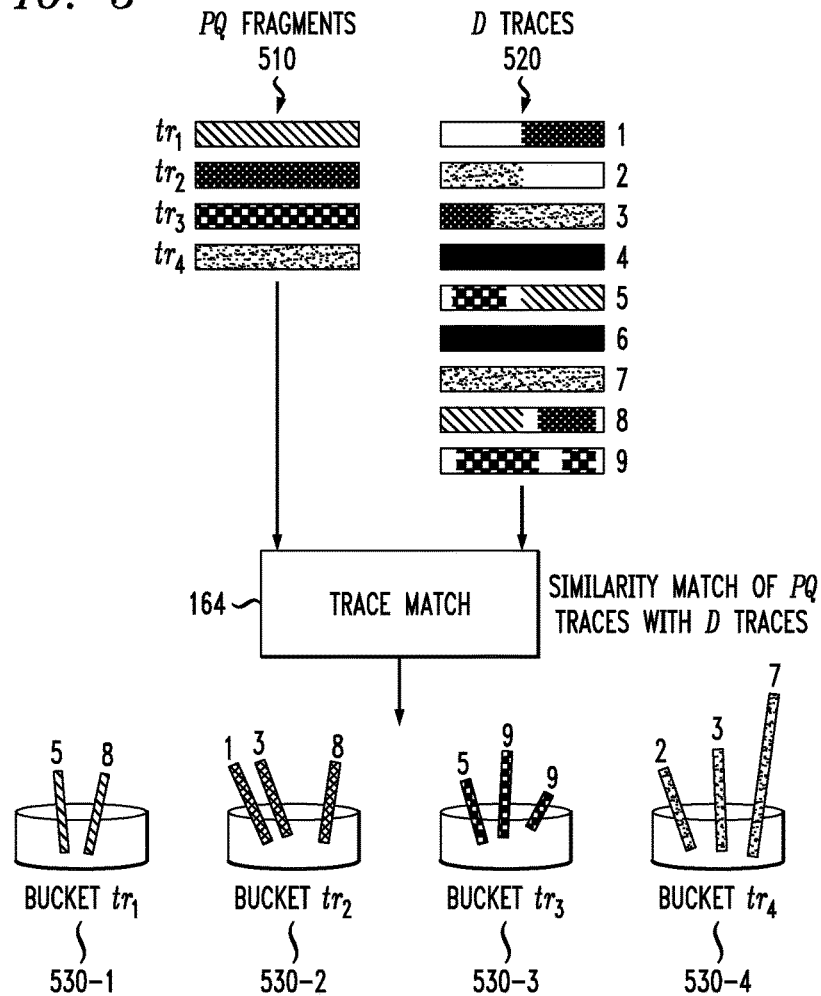
FIG. 5 illustrates exemplary semantics for the Trace Match operator of FIG. 1.

FIG. 5 illustrates exemplary semantics for the Trace Match operator 164 of FIG. 1. Generally, the Trace Match (PQ, D) operator type 164 is a special kind of join between two input relations PQ and D, which are tables of type Tracefrag. The pattern query PQ contains a pattern specified by the fragments 510 of the query and D is the complete dataset 200 where the pattern should be found. The Trace Match operator 164 returns only the trace fragments 520 in the dataset D that are similar to the trace fragments 520 in the pattern query PQ.

The Trace Match operator 164 places each similar trace fragment 520 from the dataset D (200), with respect to the pattern query PQ, into a corresponding logic bucket 530. In fact, there is a bucket 530 for each trace fragment $tr_i \in PQ$, which holds the matched trace fragments with respect to $tr_i$. A single trace 520 from the dataset D may contain distinct fragments that are similar to different fragments of the pattern query PQ, for instance the trace fragment 5 in FIG. 5. Other traces may have no similarity with the pattern query PQ, such as traces 4 and 6 in FIG. 5. Some traces might also have distinct fragments that are similar to the same fragment in PQ, such as trace 9 in FIG. 5.

Each implementation of Trace Match operator 164 uses a similarity function $F_s$:

$$F_s(qtr, tr, k, ts) = \{(mtr_1, d_1, p_1), (mtr_2, d_2, p_2), \ldots, (mtr_2, d_2, P_2)\}$$

The similarity function $F_s$ receives a trace fragment qtr from the pattern query and a trace tr from the seismic dataset 200. The similarity function $F_s$ also receives an integer number k that indicates that the function should return a maximum of top-k results and a ts that establishes a threshold for the similarity distance between qtr and trace fragments tr. Each result is a trace fragment mtr of the dataset trace tr with a specific similarity distance d and a matching descriptor p that describes how qtr matches tr.

This similarity function $F_s$ can be implemented by different comparison methods, such as the Euclidean distance, Pearson's correlation and DTW. One or more embodiments of the invention use DTW as it deals well with variation in scale and timing shown in the mapping between samples of the trace fragments in FIG 2.

The function $F_s$ can be applied to every tuple in PQ×D. The output of the various executions of the similarity function $F_s$ is collected within a relation M, which is a table of the type FragMap:

FragMap<$qtr_{id}$:integer, mtr:TraceFrog,d:real, p:descriptor>

The relation M contains the set of possible matches in the dataset D (200) for each input turtle in the pattern query PQ. The relation M stores the qtr.id of the trace fragment qtr from the query, the fragment trace mtr, the similarity distance d and the descriptor p of how qtr is mapped to mtr.

Figure 6:
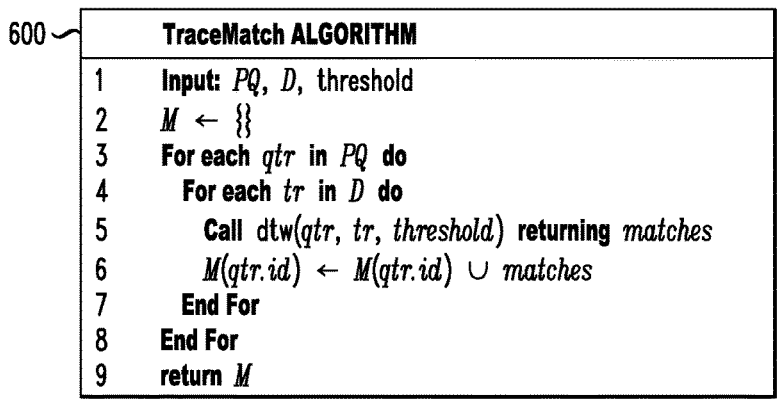
FIG. 6 illustrates exemplary pseudo code for a general implementation of a Trace Match Algorithm.

Two exemplary implementations are provided for the Trace Match operator 164. A first Trace Match implementation 600, discussed further below in conjunction with FIG. 6, is a general implementation that works with both 2D and 3D data. The general Trace Match implementation 600 tries to match all traces from the entire D dataset 200 against all the trace fragments in the pattern query PQ. The second Trace Match implementation 800, Trace MatchIlluminate, discussed further below in conjunction with FIGS. 7-9, is a specialization optimized for two dimensions. The Trace MatchIlluminate implementation 800 substantially reduces the number of comparisons but requires a strict order between the trace fragments in the pattern query PQ, which is valid for 2D datasets but not for 3D datasets.

1. General Trace Match Implementation

FIG. 6 illustrates exemplary pseudo code for a general implementation of the Trace Match Algorithm 600. Generally, Trace Match iterates over the tuples in the dataset D. For each qtr trace from the pattern query PQ, the complete set of tuples from the dataset D is traversed looking for matches. At each iteration, the matching similarity function (the DTW in an exemplary implementation) compares the qtr tuple with a tuple tr from D during step 5. The matching between the two traces may produce a set of trace fragments. The variable matches stores such results. Each entry in matches is of type FragMap describing the matched trace fragment, a cost and a similarity mapping between the matched trace fragment and the query fragment. The cost corresponds to the DTW distance between qtr and tr. A loop iterates over the matches and stores them on the set M according to the trace qtr of PQ that they are similar to.

2. Trace Match Implementation with Illumination

The exemplary Trace MatchIlluminate algorithm 800, discussed further below in conjunction with FIG. 7-9, implements the Trace Match logical operator 164 (FIG. 6) reducing the number of comparisons, as the traversal through tuples in the dataset D occurs only once and many unnecessary comparisons are avoided. The main intuition behind the algorithm 800 is to use the knowledge that, in the context of N-dimensional data in which points have a spatial relationship, such as in the exemplary seismic trace pattern query, the matches of traces in the pattern query PQ are not independent. In fact, at least one aspect of the invention recognizes that a possible solution to the pattern query PQ in the dataset D in a 2D dataset is constrained by two rules:

Matched trace fragments in the dataset D obey the same ordering as defined by the traces in the pattern query PQ.

Given two traces from the dataset D, $mtr_1$ and $mtr_2$, present in a possible solution, which match respectively to traces $qtr_1$ and $qtr_2$ from the pattern query PQ, they are at most at a distance from each other (in a 2D spatial coordinate system), Distance ε is typically the product of a predefined factor by the longest distance between two traces in the query.

Considering these two constraints, the exemplary Trace MatchIlluminate algorithm 800 can then reduce the number of comparisons. The exemplary algorithm 800 iterates through the traces in the dataset D. For each mtr trace from the dataset D, a match with the first trace in the pattern query PQ is evaluated. Note that this is the only trace fragment from the pattern query PQ that necessarily has to be evaluated against all traces in the dataset D, as it starts a possible solution set. If a match occurs between the first trace fragment from the pattern query PQ and an $mtr_i$ trace from the dataset D, then the next ε traces $mtr_i \ldots mtr_{i+\varepsilon}$ in the dataset should be marked, so that the match between them and the second trace fragment of the query PQ is evaluated. This evaluation will occur when the trace of the dataset D is processed. In the same way, a match between any trace fragment $qtr_k$ of the query PQ and a trace of the dataset D leads to scheduling the evaluation of the next ε traces as candidates for matching with the trace fragment $qtr_{k+1}$.

FIGS. 7A-7F, collectively illustrate an exemplary execution 700 of the Trace Match with illumination algorithm 800 (FIG. 8), as the traces of the dataset D are processed one after another. Whenever a trace of the dataset D is processed, such as a trace from the set of traces 710-1, the fragments of the query PQ with which they need to be compared, such as fragments 720-1, will be already marked. In this way, the number of executions of the similarity function (e.g., DTW) is substantially reduced. In addition, traces 710 of the dataset D are accessed just once.

In FIG. 7A, the dataset D contains exemplary traces 710 from 0 to 6 and the query PQ has trace fragments 720 from A to D. In FIG. 7B, a match between trace 0 and fragment A is evaluated and detected. This leads to scheduling the evaluation of matches between fragment B and traces 1, 2 and 3. In FIG. 7C, trace 1 is matched against fragment A, as all the traces need to compared with fragment A, and with fragment B, as scheduled. The match between trace 1 and fragment A is detected, leading to the scheduling of the comparison of the next three traces with B. The traces 2 and 3 were already scheduled for this comparison, but and additional scheduling for trace 4 is included. The match between trace 1 and fragment B leads to scheduling the comparison between fragment C and traces 2, 3 and 4. In FIG. 7D, trace 2 is evaluated against the fragments A, B and C but no matches are found. In FIG. 7E, trace 3 is also evaluated against fragments A, B and C and a match is found only for fragment C. This leads to the scheduling of traces 4, 5 and 6 to be compared with fragment D. Finally, in FIG. 7F, trace 4 is compared with all fragments A-D but a match is found only with fragment D. Notice that this process continues until all traces of the dataset D are evaluated. Whenever match is found, it is stored in a bucket 730-A through 730-D associated with the corresponding fragment of the query PQ.

FIG. 8 illustrates exemplary pseudo code for an exemplary implementation of the Trace MatchIlluminate Function 800. The trace MatchIlluminate function 800 controls the main loop that iterates over all traces in the dataset D. For each trace in the dataset D, the Trace MatchIlluminate function 800 checks the trace fragments of the pattern query PQ that are illuminated during step 6. If the trace fragments are illuminated, then the EvaluateMatchIlluminate function 900, as discussed further below in conjunction with FIG. 9, is called during step 7. Results are then stored in relation M during step 9 in the corresponding bucket 730 A-D (FIG. 7).

FIG. 9 illustrates exemplary pseudo code for a general implementation of the EvaluateMatchIlluminate Function 900. Generally, the EvaluateMatchIlluminate function 900 calls the exemplary DTW function during step 2 to evaluate the similarity between the trace of the dataset D and the trace fragment of the pattern query PQ. If at least one match with a distance above a predefined threshold is observed, then the next traces of the dataset D are illuminated so that they are compared with the next trace fragment of the pattern query PQ when they are processed. Results from the call of the DTW function are then returned to the calling Trace MatchIlluminate function 800.

The indication that a certain trace of the dataset D is illuminated (i.e., it has to be compared with a trace fragment of PQ) is done using a circular list, since information about the illumination of only the next ε traces of the dataset D must be maintained. This circular list structure has then to have only (ε×|PQ|) Boolean values. An initialization procedure InitializeIllumination in step 3 of the exemplary Trace MatchIlluminate Function 800 takes care of the initialization of the circular list. Function illuminated, called on step 6 of FIG. 8, is used to inform whether a certain trace has to be compared to a specific trace fragment twin the pattern query PQ. Procedure Illuminate, called on step 4 of FIG. 9, marks that a comparison between a trace of the dataset D and a trace fragment of the pattern query PQ is necessary. After processing each trace, it is necessary to reset the information about the illumination of the trace that has just been processed and adjust pointers. Procedure AdvanceIllumination, called during line 12 of the exemplary Trace MatchIlluminate Function 800 is responsible for that. Implementations of Function Illuminated and procedures Illuminate and AdvanceIllumination are straightforward but might vary depending on the implementation of the circular list where the need to compare traces is marked.

At the end of the processing, Trace MatchingIlluminate 800 will have computed all matched subtraces and assigned them to the corresponding buckets of M (e.g., 730A-730D).

Replicator Operator

Considering that the proposed operators 160 are designed to run on shared-nothing execution environments in at least one embodiment, the query optimizer 130 might decide to replicate data in order to reduce the excess of data movements between execution nodes. The dataset D is originally fragmented over several nodes. The criteria to define which node stores which part of the data is based on the geographical positioning of the traces in D, i.e. coordinates x in 2D and (x, y) in 3D.

The results obtained with the Trace Match operator 164 are also distributed across several nodes. Later in the execution plan, those trace fragments will be combined by the Candidate Solution operator 166. If the Candidate Solution operator 166 can find all of the needed fragments locally, the Candidate Solution operator 166 would produce results faster because it would not transport data from neighboring segments.

The goal of the Replicator operator 162 is to replicate data in the border across resources.

Figure 10A:
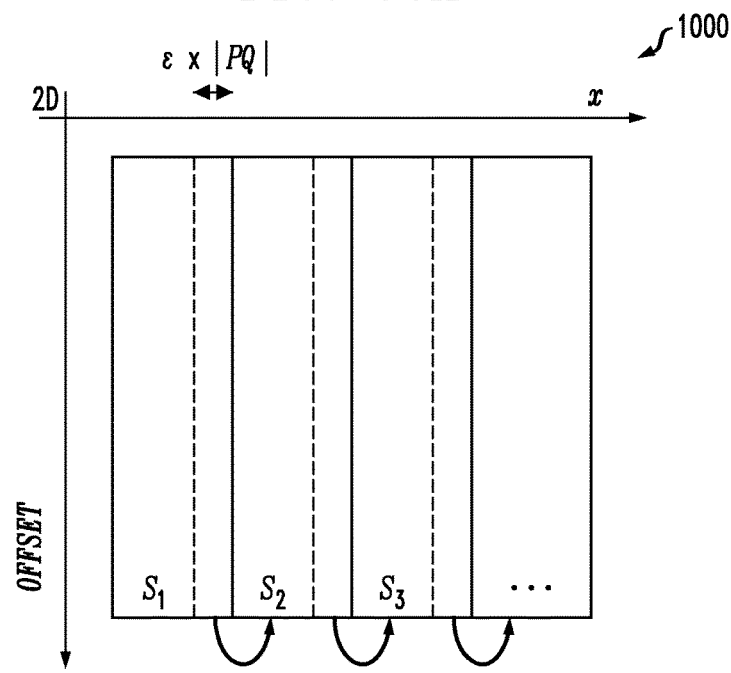
FIGS. 10A and 10B illustrate an exemplary replication of data by the exemplary Replicator operator of FIG. 1.
Figure 10B:
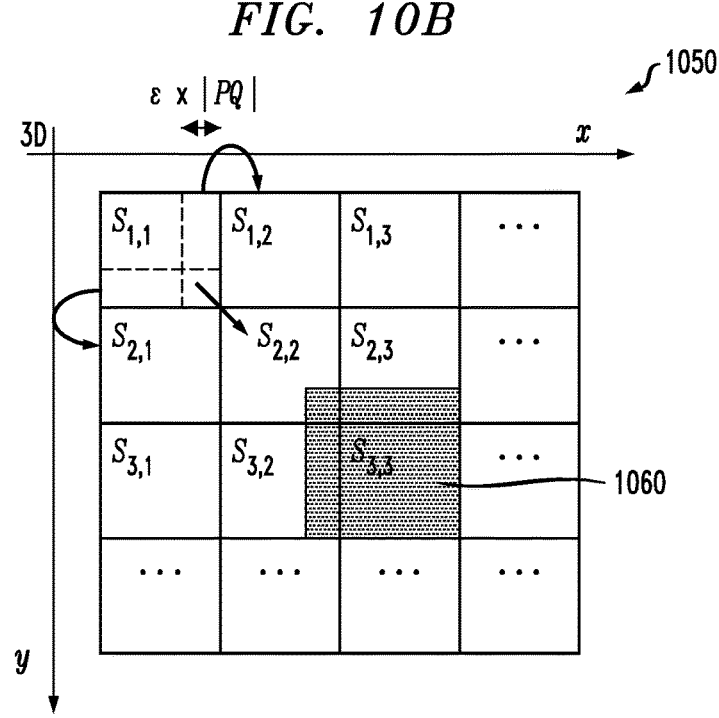

FIGS. 10A and 10B illustrate an exemplary replication of data 1000 by the exemplary Replicator operator 162. Consider the 2D dataset distributed over four segments shown in FIG. 10A. The exemplary dataset is split in segments $S_1$-$S_N$ that will be stored in specific nodes. The lines dividing the area show the original distribution of the data across the nodes. The area of each segment separated by dotted lines corresponds to trace fragments that should be replicated in a neighboring segment. Assuming that ε is the maximum distance allowed between the traces in a candidate solution 330, the replicated fragments of the previous segment correspond to those that are within the distance ε×|PQ| (in the x coordinate). By doing this replication, the candidate solution 330 can be executed locally in a shared-nothing fashion, avoiding data movements between the segments.

FIG. 10B illustrates a top-view of an exemplary three dimensional scenario 1050. A segment (i,j) has its right border replicated to segment (i+1,j), its lower border replicated to segment (i,j30 1) and the lower-right corner replicated to segment (i+1,j+1). FIG. 10B also shows the resulting replication for the 3D scenario as the gray shade 1060. Analogously to the 2D case, the amount of replicated data is associated with the maximum allowed distance between traces in the candidate solution 330 and the number of trace fragments in the query (i.e. ε×|PQ|). Notice that in this case fragments might need to be replicated up to three different segments depending on their x, y) coordinates.

The Candidate Solution Operator

The Candidate Solution (PQ, M, B) operator type 166 combines trace fragments and builds a set of valid candidate solutions 330 for a pattern query PQ according to the constraints in B and the relation of possible matches M.

Consider a horizontal fragment $M_i$ of relation M as $M_i \leftarrow \sigma_{qtr.id=i}(M)$. Each fragment $M_i$ contains the matches for the respective trace fragment $tr_i \in PQ$. Thus, the set of all possible candidate solutions 330 is $M_i \times M_{i+1} \times \ldots \times M_{i+k}$. However, only the solutions that satisfy the constraints in B should be selected, i.e., $\sigma_{B_1 AB_2 A \ldots AB_v}(M_i \times M_{i+1} \times \ldots \times M_{i+k})$. In addition to the constraints in B, as described above, the solutions must satisfy θ (the constraint related to the relative position of the trace fragments). The results are arranged in the output schema as:

$S<id_s$:integer, m:array of FragMap> where $id_s$ is a unique identification of the candidate and m is the mapping between the trace fragments in PQ and the corresponding trace fragments in the dataset.

FIG. 11 illustrates exemplary pseudo code for an implementation of the Candidate Solution operator 166. The exemplary Candidate Solution operator 166 performs a locality-based search instead of a full cross-product of $M_i$ fragments. The exemplary Candidate Solution operator 166 selects a trace fragment from $M_i$ and attempts several combinations with fragments from $M_{i+t}$ that respect the constraints B and θ. This is a sequence of joins between $M_i$ and $M_{i+1}$ constrained by B and θ. For instance, it only considers traces from $M_{i+1}$ that are geographically near the trace chosen from $M_i$. Notice that the active constraints are filtered from B and θ in step 4 prior the execution of the join in step 5. In this way, whenever a partial solution is not valid, it is immediately discarded, improving performance.

Ranking Operator

The Ranking (PQ, S, CF) operator type 168 is used to measure the quality of the candidate solutions 330. In one exemplary embodiment, a cost function CF is used to rank the solutions for a pattern query PQ. Candidate solutions 330 with lower costs appear at the beginning of the results. The Ranking operator 168 expects to receive the relation S as input $S<id_s$:integer, $m$:array of FrogMap>

For each tuple in S, the Ranking operator 168 computes the cost c=CF(PQ,m) and orders the results by the value of c. The output relation O corresponds to the projection $\pi_{id_s,m,CF(PQ,m)}(S)$ ordered by CF(PQ,m) and has the following schema:

$O<id_s$:integer, $m$:array of FragMap, $c$:real>

Three exemplary implementations are provided for the Ranking operator type 168: fast comparison, shape context and DIW (Dynamic Image Warping).

FIG. 12A is a flow chart 1200 illustrating an exemplary implementation of the ranking operator 168. As shown in FIG. 12A, one or more candidate solutions 330 to be processed are obtained during step 1205. For each candidate solution 330, a loop is started during step 1210. The quality of the current candidate solution 330 is measured during step 1215 using a quality measure process 1250, discussed further below in conjunction with FIG. 12B, that employs a fast comparison approach.

The current candidate solution 330 is inserted, during step 1220, in a list 1230 of candidate solutions 330, ordered by the cost computed by the quality measure process 1250 during step 1215. If it is determined during step 1225 that there are additional candidate solutions 330 to process, then program control returns to step 1210 and continues in the manner described above.

FIG. 12B illustrates an exemplary implementation of a quality measure process 1250 that measures the quality of a candidate solution 330 using a fast comparison approach. In the exemplary fast comparison approach, the endpoints of each trace fragment in m are assumed to form a geometric shape.

As shown in FIG. 12B, the exemplary quality measure process 1250 processes a candidate solution m and its DTW matching costs (the values of the DTW differences between trace fragments from PQ and from the candidate solution) 1255. The geometric shape composed of the endpoints of each trace fragment in m is computed during step 1265. During step 1270, the DTW matching costs of every trace in m are all summed and stored into the component DTWSum. The center of mass of the geometric shape is calculated during step 1275 assuming that each endpoint has a unitary mass. At the end of step 1275, the distance between each endpoint of the shape and its center of mass is computed and summed into the component DTCSum. The step 1280 receives the value of DTCSum of the candidate m as well as the DTCSum 1285 of the query PQ and compute their difference, namely DTCDiff. The final cost is calculated during step 1290 considering the two calculated components: DTWSum and DTCDiff. These components are combined according to a weight α 1295 as follows:

Final Cost=α(DTCDiff)+(1−α)(DTWSum)

This approach allows the user to ajust the value of α to indicate which component have more weight in the final cost.

For an alternative Shape Context approach, the shape descriptor is computed as described in Serge Belongie et al. "Matching with Shape Contexts," Proc. IEEE Workshop Content-Based Access Image Video Library, IEEE Comput. Society, 20-26 (3000), incorporated by reference herein.

Finally, for an alternative exemplary DIW approach, the minimal deformation that is necessary to shift the pattern query to the candidate solution 330 is estimated using the cost function described in Leonid Pishchulin et al., "Image Warping for Face Recognition: From Local Optimality Towards Global Optimization," J. Pattern Recognition, Vol, 45, 3131-140 (2012), incorporated by reference herein.

State of the art seismic data processing systems use specific programs to implement required data transformations that make it harder to re-use them in other similar implementations and preclude automatic optimization. Moreover, due to the large volume of data involved in seismic data interpretation, enabling data parallelism is paramount. Scaling specific programs to explore data parallelism, however, requires a clear understanding of the data being processed and the semantics of the data transformation being applied.

Aspects of the present invention leverage seismic data processing by modeling it as an algebraic expression problem in line with the work on the database Relational Model. A set of algebraic operator types composing the seismic algebra are disclosed, taking into account that they should be implemented as embarrassingly parallel algorithms as possible so that efficiency and scalability can be achieved. The exemplary algebraic operator types are independent of each other and provide a clear input and output interface, so that they can be reused in other seismic processing approaches other than the execution of pattern queries.

Moreover, given the generality of the disclosed exemplary operator types, the algebraic expression can be applied to different N-dimensional datasets, eventually providing a better implementation that would offer a better fit to the data. Finally, the disclosed algebra is a good basis for data manipulation and is agnostic with respect to the execution model. Thus, different execution environments such as MPP databases, Hadoop or HPC applications can support the disclosed algebra.

Figure 13:
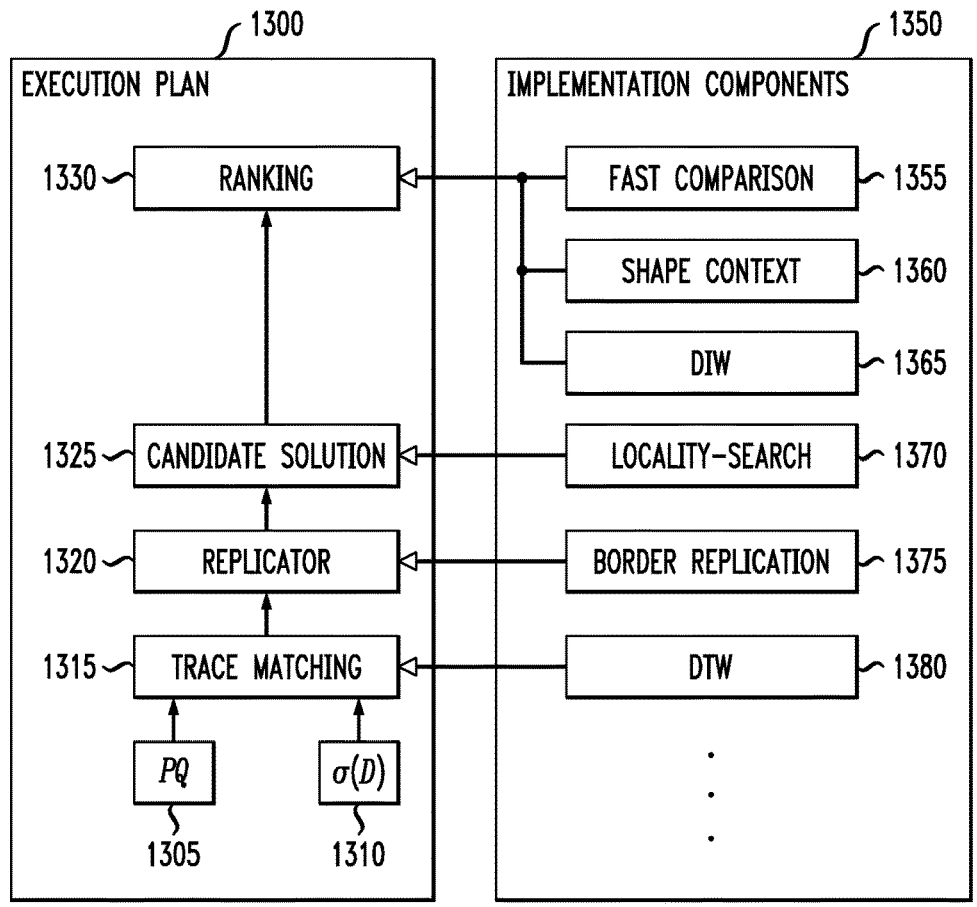
FIG. 13 illustrates an overview of a typical query execution plan.

FIG. 13 illustrates an overview of a typical query execution plan 1300. The exemplary query execution plan 1300 is comprised of the following seismic algebraic operators that are applied to the pattern query PQ (1305) and the dataset D (1310): Trace Match 1315, Replicator 1320, Candidate Solution 1325 and Ranking 1330.

As noted above, one of a plurality of available implementations 1350 of at least one algebraic operator is dynamically selected for the query execution plan 1300 during the optimization process, based on, for example, characteristics of the pattern query, information about the dataset and/or available computing resources. For example, the exemplary implementation components 1350 comprise three exemplary implementations for the Ranking operator type 1330: fast comparison 1355, shape context 1360 and DIW 1365; as well as a locality-search implementation 1370 for the Candidate Solution operator 1325; a border replication implementation 1375 for the replicator operator 1320; and a DTW implementation 1380 for the Trace Matching operator 1315. As discussed above in conjunction with FIGS. 5-9, other matching similarity functions can be employed instead of the DTW implementation.

Partitioning of the Dataset

The semantics of the parallel execution for pattern queries assumes two important aspects. Firstly, the available computing resources include a network of processing nodes with local storage. The N-dimensional dataset (D), targeted by a pattern query, is partitioned through such nodes in disjunctive subsets of D. Secondly, each node storing a partition of D runs an instance of the query execution engine capable of processing locally a fragment ($fr_i$) of a query execution plan.

The partitioning strategy to distribute traces in the dataset D amidst available processing nodes fosters the parallelization of a pattern query evaluation, while minimizing processing skew. Given the dataset D, partitioned according to a certain partitioning criterion, each such partition is allocated on a different processing node. The system can parallelize the execution of a pattern query PQ on the dataset D, by submitting fragments of its execution plan 1300 whose operators 1315, 1320, 1325, 1330 can process locally on data at each node.

The decision on the partitioning criterion is important. It is possible to distribute data randomly through processing nodes to minimize skew. However, there are other data partitioning strategies that optimize the parallel execution. For instance, the geographic position of the traces can be employed as a criterion for distribution (i.e., traces that are near in space tend to be in the same resource). After the execution of the Trace Match operator 1315, results remain distributed across the resources according to their positioning. Consider that the query requires the processing of the Candidate Solution operator 1325 just after Trace Match 1315. If near traces are stored together in the same resource, the query execution takes advantage of data locality. This happens because good candidate solutions 330 tend to aggregate trace matches that are near to each other. It is clear that if the Replicator operator 1320 is not executed before the Candidate Solution operator 1325 there will still be data motion, since there are data in the borders that need to be combined. However, the query optimizer 130 can use the constraints defined in B to move only the real necessary data.

Besides the choice of the partitioning criteria, there are other optimization opportunities the exemplary query optimizer 130 explores, for instance:

Parallelization of Selections—A selection is as unary operation that selects data, from a given relation, that satisfies some criteria. The criteria are evaluated independently on each tuple of the relation. For instance, the criteria may be the functions of the set B. If the input relation is distributed over n resources, the selection runs in parallel on the n fragments and the final result is the union of the independent results.

Move Only the Projection of the Data—The Candidate Solution operator type 1325 combines several TraceFrag data into a solution. The trace fragments that will be combined may be distributed over several resources. Thus, data needs to be moved. However, the execution of the query might not need the amplitude values of the trace, for instance, if the Fast Comparison implementation 1355 for the Ranking operator 1330 is used. Fast comparison requires only the spatial coordinates of the trace and the similarity distances. Thus, prior to moving the data from another resource to build a candidate solution 330, the engine might make a projection ($\pi$) of the data to move only the necessary data, i.e., the spatial coordinates of the trace fragments and their similarity distance.

EXAMPLES

Example 1: Using Seismic Pattern Queries (PQ) to Identify Patterns of Interest

The system 100 allows the interpreter to define a seismic pattern of interest by specifying a pattern query PQ. The interpreter can build the input pattern with the attributes from the seismic dataset that are available on the system 100, such as (i) amplitude, (ii) phase, (iii) frequency, and (iv) geographic coordinates. The input pattern query PQ can be a region with specific seismic stratigraphic structures such as onlaps, down laps, toplaps, offlaps or unconformities. Alternatively, the interpreter may want to search for structural styles of the basin. These bigger structures are associated with the tectonic efforts against the basement of the basin.

The pattern query PQ is interpreted by the query processing layer and translated into operators 160 of the seismic algebra that execute the automatic identification of likely geological patterns throughout the database, which have the best correlated similarities to the input pattern. The query processor can choose different implementations of the operator types according to the type of the pattern. For instance, there may be one candidate solution implementation tailored for stratigraphic structures and another for structural styles.

The response to a pattern query PQ is a list of the best candidates found by the query execution. The interpreter may then evaluate each found object. Generally, the recognition of these patterns would be much slower and not trivial if performed manually by visual analysis and comparison of data values.

Example 2: Pattern Queries on a Specific Region of the Data

Based on the geological history of a basin, sometimes the interpreter already knows a sub-area of interest. Thus, he or she may want to execute pattern queries only on this sub-area. The proposed algebra is an extension of relational algebra, thus, a sub-area D' of the dataset D is a selection of D that returns only the trace fragments that have the coordinates (x, y) inside the sub-area of interest. Since D' inherits the schema of D, the proposed operators will work on D' the same way they work on D.

Example 3: Storing and Retrieving Patterns of Geological Objects

Once a pattern query PQ delivers to the user a ranking of the best candidates found, the interpreter can classify them as geological objects, for example, defining them as horizons or other stratigraphic features, according to the prior geological knowledge of the basin in analysis.

It is possible to classify, name and save previously identified geological objects using commands of the SeisQL query language. This would build a knowledge base of geological objects, which can be used as patterns to be searched in others datasets.

A knowledge base of geological objects shared by different interpreters creates a collaborative environment that tends to improve the interpretation activity. Besides improving collaboration, the mechanism of storing and retrieving geological objects is efficient regarding processing costs since the knowledge base of geological objects avoids the re-processing of pattern queries PQ on SEG-Y data.

Example 4: Detecting Horizons Continuity Surrounding a Fault

The interpreter can select a region containing the portion of a horizon on one side of a fault, which may be a normal or a reverse fault. The selected region is then automatically mapped to a pattern query PQ.

The pattern query PQ is interpreted, processed and executed (query processing and execution layers). The result of the pattern query PQ is a list of the best candidate patterns found by the system that indicates the continuity of the horizon across the fault. This functionality can help the interpreter to decide where a particular horizon continues after a fault.

Conclusion

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 14:
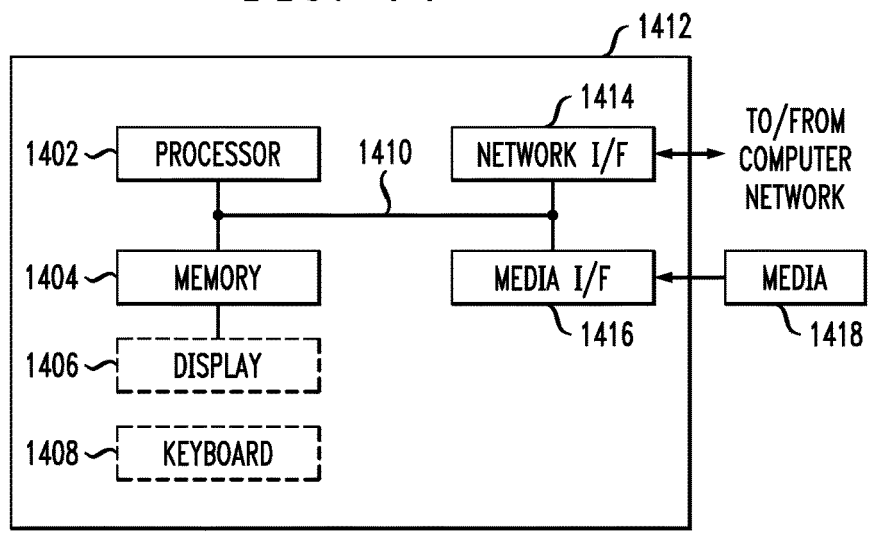
FIG. 14 is a system diagram of an exemplary computer system on which at least one embodiment of the invention can be implemented.

By way of example, an aspect of the present invention can make use of software running on a general purpose computer. FIG. 14 is a system diagram of an exemplary computer system on which at least one embodiment of the invention can be implemented. As depicted in FIG. 14, an example implementation employs, for example, a processor 1402, a memory 1404, and an input/output interface formed, for example, by a display 1406 and a keyboard 1408. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 1402, memory 1404, and input/output interface such as display 1406 and keyboard 1408 can be interconnected, for example, via bus 1410 as part of a data processing unit 1412. Suitable interconnections via bus 1410, can also be provided to a network interface 1414 (such as a network card), which can be provided to interface with a computer network, and to a media interface 1416 (such as a diskette or compact disc read-only memory (CD-ROM) drive), which can be provided to interface with media 1418.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU, Such software can include firmware, resident software, microcode, etc.

As noted above, a data processing system suitable for storing and/or executing program code includes at least one processor 1402 coupled directly or indirectly to memory elements 1404 through a system bus 1410. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1408, displays 1406, and pointing devices, can be coupled to the system either directly (such as via bus 1410) or through intervening I/O controllers.

Network adapters such as network interface 1414 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1412 as depicted in FIG. 14) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices that can benefit from improved analytical processing of provenance data. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method for executing similarity-based pattern matching tasks over one or more N-dimensional input datasets, the method comprising steps of:

providing data representations, for the one or more N-dimensional input datasets with spatial-temporal constraints and comprised of numeric values, of a pattern query comprising a plurality of trace fragments and one or more candidate solutions for the pattern query, such that the pattern query specifies a pattern of an N-dimensional body that is compared to at least one of the one or more candidate solutions corresponding to an N-dimensional body extracted from the one or more N-dimensional input datasets;

defining, using at least one processing device, a distance metric that compares each trace fragment in one or more combinations of trace fragments of the N-dimensional body formed by the at least one candidate solution extracted from the one or more N-dimensional input datasets and each of the plurality of trace fragments in the N-dimensional body formed by the pattern query, taking into account one or more of the following criteria: differences between mapped values, differences in scale, and differences in shape;

executing, in parallel, using the at least one processing device, a plurality of independent instances of at least one algebraic operator to generate and score one or more of the candidate solutions based on the distance metric and the spatial-temporal constraints; and providing, using the at least one processing device, the one or more of the candidate solutions with corresponding scores as an output.

2. The method of claim 1, wherein: the one or more N-dimensional input datasets are represented as sets of traces, with each trace being composed of: (a) a sequence of numeric values, and (b) an (N-1)-dimensional position, with the $N^{th}$ coordinate of each numeric value given by its position within the corresponding sequence;

the pattern query is represented as the set of trace fragments, with each trace fragment being composed of: (a) a sequence of numeric values, (b) an (N-1)-dimensional position and (c) an offset, which is added to the position of each numeric value within the sequence to obtain the $N^{th}$ coordinate of the numeric value;

the one or more candidate solutions for the pattern query are represented as a set of trace fragments extracted from one of the N-dimensional input datasets, with each trace fragment of a given candidate solution corresponding to a subsequence of a trace of the one of the N-dimensional input datasets with an offset corresponding to a position of the first value of a subsequence in the sequence;

the distance metric is computed based on a relative position of the trace fragments, within the corresponding N-dimensional bodies, and the alignment between the plurality of trace fragments, so that one or more of the following criteria being taken into account: differences between mapped values, differences in scale and differences in shape; and one or more parts of input data and intermediary results are replicated such that the plurality of independent instances of the at least one algebraic operator accesses only data locally stored at a respective node that executes a corresponding instance.

3. The method of claim 1, further comprising processing the one or more candidate solutions to remove at least one of the one or more candidate solutions based on one or more Boolean constraints.

4. The method of claim 2, wherein the at least one algebraic operator comprises a Trace Match operator that identifies the trace fragments in the one or more N-dimensional input datasets that are similar to one or more of the trace fragments of the pattern query.

5. The method of claim 4, wherein the Trace Match operator performs a similarity search algorithm over the one or more N-dimensional input datasets and logically places similar trace fragments extracted from the one or more N-dimensional input datasets into a corresponding bucket.

6. The method of claim 5, wherein the similarity search algorithm applies a Dynamic Time Warping (DTW) technique to allow a flexible alignment of the similar trace fragments, encompassing differences in scale and shape between the similar trace fragments.

7. The method of claim 4, wherein the one or more N-dimensional input datasets comprise two-dimensional data and wherein the Trace Match operator applies an illumination strategy to progressively define matches between the trace fragments that need to be compared, so that a need to compare a given trace fragment from a given one of the one or more N-dimensional input datasets with any trace fragment from the pattern query is known before the given trace fragment from the given input dataset is treated, thereby reducing a number of comparisons and allowing the Trace Match operator to traverse the one or more N-dimensional input datasets only once.

8. The method of claim 4, wherein the Trace Match operator is executed within a massively parallel processing environment, with multiple nodes locally storing partitions of the one or more N-dimensional input datasets; and multiple local instances of the Trace Match operator are executed in each node, matching a replica of the pattern query against only the trace fragments stored at each node.

9. The method of claim 2, further comprising clustering one or more of the plurality of trace fragments of the pattern query, using a Query Clustering operator such that the pattern query is reduced to a smaller set of representative of the plurality of trace fragments.

10. The method of claim 1, wherein the at least one algebraic operator comprises a Ranking operator that ranks the one or more candidate solutions based on the distance metric calculated by a cost function.

11. The method of claim 10, wherein the Ranking operator is executed by multiple instances in parallel that access data locally stored, rank candidate solutions locally and then merge all local rankings to inform a global ranking to a user.

12. The method of claim 10, wherein the Ranking operator executes one of the following methods: (a) a fast comparison method that combines a distance to a center of mass of trace fragments and Dynamic Time Warping (DTW) distances; (b) a shape context method, and (c) a dynamic image warping (DTW) method.

13. The method of claim 1, wherein the at least one algebraic operator comprises a Candidate Solution operator that combines one or more trace fragments and evaluates a plurality of constraints to decide whether a given candidate solution is valid.

14. The method of claim 13, wherein the Candidate Solution operator is executed by multiple instances in parallel that access data locally, and store results locally.

15. The method of claim 13, further comprising replicating the one or more of trace fragments so that the Candidate Solution operator is independently executed by a plurality of nodes.

16. The method of claim 1, further comprising generating an execution plan for the pattern query combining results of a plurality of the at least one algebraic operator.

17. The method of claim 1, wherein the one or more N-dimensional input datasets comprise seismic data.

18. The method of claim 1, wherein the one or more N-dimensional dimensional input datasets comprise three-dimensional data and wherein a similarity search algorithm takes into account one or more rotations of the one or more candidate solutions around a vertical axis to compute a similarity of the three-dimensional data bodies.

19. The method of claim 1, further comprising dynamically selecting one of a plurality of implementations of the at least one algebraic operator based on one or more of characteristics of the pattern query, information about the one or more N-dimensional input datasets, and available computing resources.

20. A computer program product for executing similarity-based pattern matching tasks over one or more N-dimensional input datasets, the computer program product comprising a non-transitory machine-readable storage medium having encoded therein executable code of one or more software programs, wherein the one or more software programs when executed perform steps of:

providing data representations, for the one or more N-dimensional input datasets with spatial-temporal constraints and comprised of numeric values, of a pattern query comprising a plurality of trace fragments and one or more candidate solutions for the pattern query, such that the pattern query specifies a pattern of an N-dimensional body that is compared to at least one of the one or more candidate solutions corresponding to an N-dimensional body extracted from the one or more N-dimensional input datasets;

defining, using at least one processing device, a distance metric that compares each trace fragment in one or more combinations of trace fragments of the N-dimensional body formed by the at least one candidate solution extracted from the one or more N-dimensional input datasets and each of the plurality of trace fragments in the N-dimensional body formed by the pattern query, taking into account one or more of the following criteria: differences between mapped values, differences in scale, and differences in shape;

executing, in parallel, using the at least one processing device, a plurality of independent instances of at least one algebraic operator to generate and score one or more of the candidate solutions based on the distance metric and the spatial-temporal constraints; and providing, using the at least one processing device, the one or more of the candidate solutions with corresponding scores as an output.

21. A system for executing similarity-based pattern matching tasks over one or more N-dimensional input datasets, comprising:

a memory; and at least one hardware device, coupled to the memory, operative to implement the following steps:

providing data representations, for the one or more N-dimensional input datasets with spatial-temporal constraints and comprised of numeric values, of a pattern query comprising a plurality of trace fragments and one or more candidate solutions for the pattern query, such that the pattern query specifies a pattern of an N-dimensional body that is compared to at least one of the one or more candidate solutions corresponding to an N-dimensional body extracted from the one or more N-dimensional input datasets;

defining, using at least one processing device, a distance metric that compares each trace fragment in one or more combinations of trace fragments of the N-dimensional body formed by the at least one candidate solution extracted from the one or more N-dimensional input datasets and each of the plurality of trace fragments in the N-dimensional body formed by the pattern query, taking into account one or more of the following criteria: differences between mapped values, differences in scale, and differences in shape;

executing, in parallel, using the at least one processing device, a plurality of independent instances of at least one algebraic operator to generate and score one or more of the candidate solutions based on the distance metric and the spatial-temporal constraints; and providing, using the at least one processing device, the one or more of the candidate solutions with corresponding scores as an output.

22. The system of claim 21, wherein the at least one algebraic operator comprises a Trace Match operator that identifies trace fragments in the one or more N-dimensional input datasets that are similar to one or more of trace fragments of the pattern query.

23. The system of claim 21, wherein the at least one algebraic operator comprises a Ranking operator that ranks the one or more candidate solutions based on the distance metric calculated by a cost function.

24. The system of claim 21, wherein the at least one algebraic operator comprises a Candidate Solution operator that combines one or more trace fragments and evaluates a plurality of constraints to decide whether a given candidate solution is valid.

25. The system of claim 21, further comprising clustering one or more of the plurality of trace fragments of the pattern query using a Query Clustering operator such that the pattern query is reduced to a smaller set of representative of the plurality of trace fragments.

26. The system of claim 21, further comprising dynamically selecting one of a plurality of implementations of the at least one algebraic operator based on one or more of characteristics of the pattern query, information about the one or more N-dimensional input datasets, and available computing resources.

* * * * *

UNITED STATES PATENT AND TRADEMARK OFFICE
CERTIFICATE OF CORRECTION

PATENT NO. : 10,360,215 B1
APPLICATION NO. : 14/672516
DATED : July 23, 2019
INVENTOR(S) : Angelo E. M. Ciarlini et al.

Page 1 of 1

It is certified that error appears in the above-identified patent and that said Letters Patent is hereby corrected as shown below:

On the Title Page

Inventors Item (72), replace "Bias" with --Dias--.

In the Claims

Column 25, Line 2, in Claim 18, delete "dimensional" second occurrence.

Signed and Sealed this
Seventeenth Day of September, 2019

Andrei Iancu
*Director of the United States Patent and Trademark Office*